May 5, 1942.  A. R. WURTELE  2,281,904
HARVESTER
Filed Nov. 15, 1938  4 Sheets-Sheet 1

INVENTOR.
Allan R. Wurtele
BY
F. Bascom Smith
ATTORNEY.

May 5, 1942. A. R. WURTELE 2,281,904
HARVESTER
Filed Nov. 15, 1938 4 Sheets-Sheet 2

INVENTOR.
Allan R. Wurtele
BY
F. Bascom Smith
ATTORNEY.

May 5, 1942. A. R. WURTELE 2,281,904
HARVESTER
Filed Nov. 15, 1938 4 Sheets-Sheet 3

INVENTOR.
Allan R. Wurtele
BY F. Bascom Smith
ATTORNEY

May 5, 1942. A. R. WURTELE 2,281,904
HARVESTER
Filed Nov. 15, 1938 4 Sheets-Sheet 4

INVENTOR.
Allan R. Wurtele
F. Bascom Smith
ATTORNEY.

Patented May 5, 1942

2,281,904

UNITED STATES PATENT OFFICE 2,281,904

HARVESTER

Allan R. Wurtele, New Roads, La.

Application November 15, 1938, Serial No. 240,480

22 Claims. (Cl. 56—17)

This invention relates to harvesters and more particularly to power driven machinery adapted to harvest crops constituted by plants having elongated stalks, such as sugar cane and like crops.

Many attempts have been made heretofore to provide a satisfactory machine for harvesting sugar cane. None of these prior attempts have been successful for many reasons, among which is the fact that prior machines embodying the essentials of a cane harvester have been much too heavy to operate satisfactorily on the soft soil in which sugar cane must be grown. Prior machines adapted to harvest sugar cane and similar crops have also been extremely complicated mechanically and subject to being clogged and stopped by the large amount of leaves, vines, weeds, etc., from which the stalks must be separated. Additionally, harvesters heretofore provided for crops of the above nature have necessitated the use of ground engaging supports which were so disposed as to render the machines wholly impracticable from the standpoint of maneuverability.

As a result of the fact that no practicable harvester for sugar cane and like crops has been heretofore provided, such crops are still being harvested by hand on many hundreds of thousands of acres of land throughout the world. This latter method of harvesting sugar cane, for example, requires a large number of workers for a comparatively short season and is accordingly extremely expensive. Furthermore, manual harvesting is slow, thus making it necessary for the cane planter in many localities to run the risk of having a substantial portion of his crop damaged by freezing. Additionally, when sugar cane is harvested by hand or prior mechanical harvesters, parts of the stalk having high sugar content are often cut off and parts constituting valuable feed for live stock are scattered over the field and wasted.

Accordingly, one of the objects of the present invention is to provide a novel and practical mechanical harvester by means of which sugar cane and similar crops may be satisfactorily, rapidly and economically harvested without waste.

Another object of the invention is to provide novel apparatus for harvesting crops of the above nature which is of light weight and readily maneuverable in soft soil.

Another object is to provide novel mechanical means for harvesting sugar cane and like crops which means may be mounted with comparatively excellent balance on a four-wheel power driven vehicle.

Another object is to provide a novel cane harvester adapted for harvesting sugar cane wherein a common source of power may be employed for propelling the same along the ground and for driving the various operating parts thereof.

Still another object is to provide cane harvesting means which may be mounted on and removed from a standard tractor with comparative ease, thereby making the tractor available for other uses between harvesting seasons.

A still further object is to provide a harvester wherein novel means are provided for cutting the upper series of leaves or bush portion off the plants to be harvested.

Still another object is to provide novel means in a cane harvester for stripping the foliage and foreign matter from the sugar bearing portion of the cane stalks.

Another object is to provide a mechanical harvester embodying novel apparatus whereby the nubbins adjacent the upper ends of sugar cane stalks may be systematically removed and accumulated for use as feed for live stock.

Another object is to provide novel means in a harvesting machine for conveying plant stalks to and depositing the same on a platform from which they may be discharged singly or periodically dumped in bunches of convenient size so as to not interfere with operation of the harvester in cutting adjacent rows.

Another object is to provide novel conveyor means in a harvester which are adapted to support stalks of plants being harvested in an upright position during and after the cutting and topping thereof.

It is also an object of the invention to provide a novel harvester which is so constructed that the probability of the same becoming clogged or jammed by leaves, vines, weeds, etc., is substantially obviated.

Another object is to provide a harvester for sugar cane and like crops which is openly constructed so that all of the operating parts are readily accessible and visible to an operator at all times.

The above and further objects and novel features of the invention will more fully appear from the following detailed description when the same is read in connection with the accompanying drawings. It is to be expressly understood however, that the drawings are for the purpose of illustration only and are not intended to define the limits of the invention, reference for this latter purpose being had primarily to the appended claims.

In the drawings wherein like reference characters refer to like parts throughout the several views.

In the form illustrated, by way of example, the invention is shown as being embodied in a sugar cane harvester which comprises a comparatively open frame structure removably supported on the chassis of a four-wheel power-driven tractor of standard construction. The frame structure is built to accommodate and support means for gathering, bushing, stripping, cutting, conveying and topping the cane plants to be harvested. The driving mechanisms or trains for all of the above mentioned means are preferably driven by the prime mover which propels the tractor, thus making it unnecessary to provide more than a single power unit. Very often, because of weather conditions or other natural causes, sugar cane plants grow with the central stalks thereof extending upwardly but at an angle to the vertical. The present invention provides novel means for gathering the plants or bushes in each row and lifting the stalks to a substantially vertical position for facilitating the cutting and stripping thereof. As the stalks approach a vertical position the uppermost leaves thereof are cut off by novel cutting means and leaves intermediate the ends of the stalks are stripped therefrom in a novel manner. Each stalk is then individually gripped intermediate its ends by novel conveying mechanism which holds the same against bending while it is being cut loose from its roots at a point near the ground by novel cutting means. The stalks, after being cut, are conveyed in a nearly vertical position through novel stripping means which are effective to remove leaves, vines, etc., from the lower ends of the stalks and thence at substantially right angles to the direction of movement of the harvester to an adjustable topping cutter that cuts the nubbins or upper ends from the stalks. The nubbins are directed into a box or bin mounted on the opposite side of the tractor from the stalk cutting means and from which the nubbins may be periodically dumped and used for feeding live stock, such as cattle. The cane stalks, which are now ready for the sugar mill, are released by the conveyor and deposited on a platform at the rear of the harvester from which they may be dumped, singly or in bunches of convenient size, outside the path of the harvester during the cutting of the adjacent row of plants.

Figure 3:
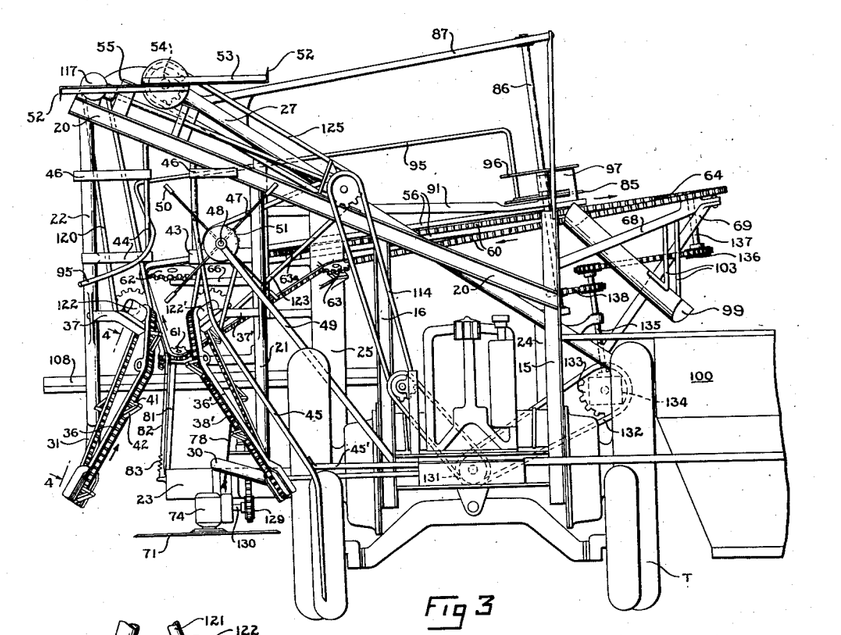
Fig. 3 is a front elevation of said harvester with parts broken away.
Figure 4:
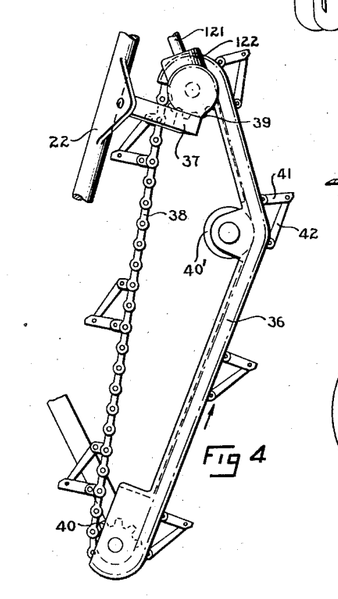
Fig. 4 is a detail view, with parts broken away, taken substantially along line 4—4 of Fig. 3.

In one form of harvester embodying the present invention which has been constructed and satisfactorily tested, the supporting frame for the various operating parts is removably mounted on and secured to a standard McCormic-Deering "Farmall" tractor, diagrammatically shown at T, substantially in the manner illustrated in the accompanying drawings. The main supporting members of the harvester frame, which are attached to the tractor, consist of two vertical posts 15, 16 (Fig. 3) and two rearwardly extending horizontal beams 17, 18 (Fig. 1) removably connected in any suitable manner, such as by bolts, to flanges 19 on the rear wheel drive housing of the tractor, which flanges are normally provided for the attachment of a draw bar. Secured to posts 15, 16 and extending laterally and upwardly at an angle beyond the right side of tractor T, as viewed from the rear, is a main top beam 20. Depending from the latter and forming therewith an arch-like structure are a pair of vertical supporting members 21, 22 (Fig. 3).

Figure 13:
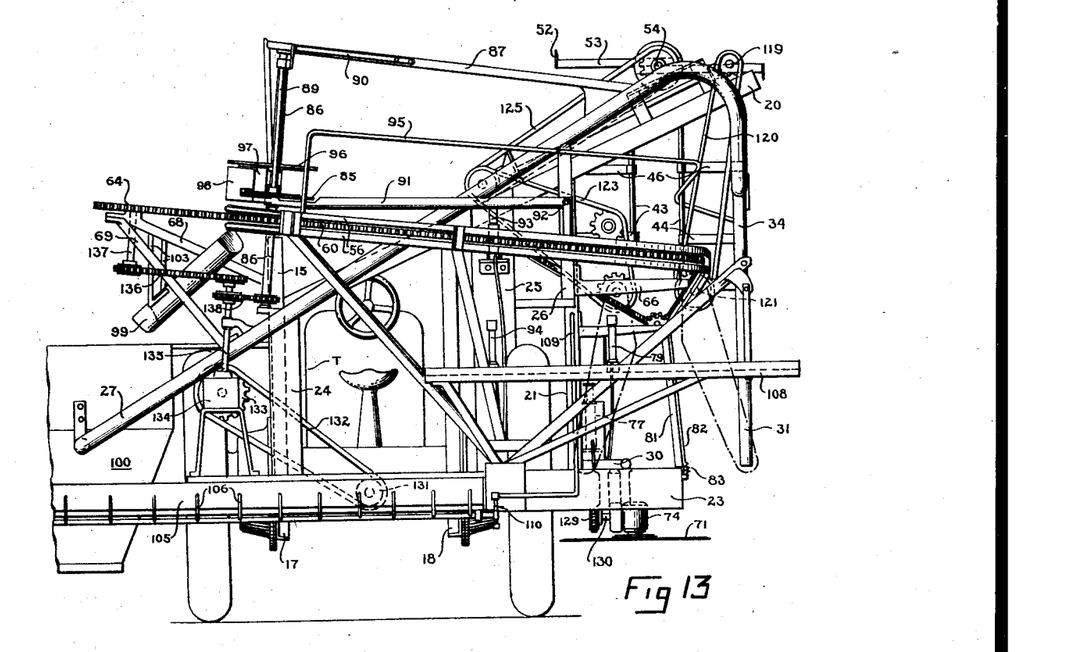
Fig. 13 is a rear elevation view of the harvester with parts broken away.

At the rear of the harvester, as best seen in Fig. 13, a horizontal beam 23 is secured across beams 17, 18 and extends laterally in both directions therefrom. Rigidly secured to and projecting upwardly from rear supporting beam 23 are two posts 24 and 25, said posts being of different lengths and having the upper ends thereof joined by a laterally extending member 27 which slopes upwardly beyond the right-hand side of the tractor. Depending from member 27 is a supporting post 26.

Figure 7:
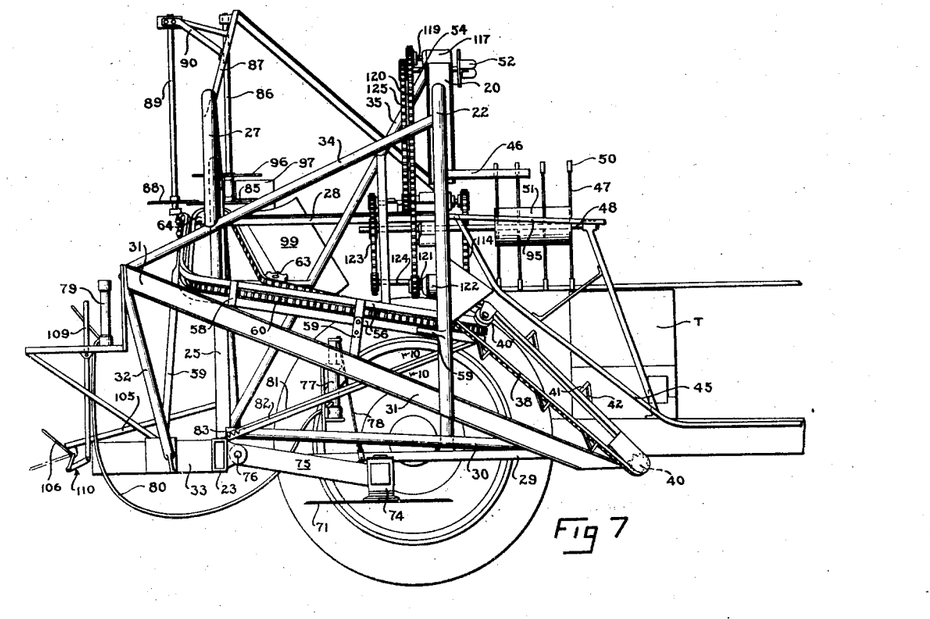
Fig. 7 is a side elevation view of the harvester with parts at the forward end thereof broken away.

The above described vertically-extending front and rear portions of the harvester frame are joined together by a plurality of braces and cross-beams comprising member 28 (Fig. 7) which joins rear post 25 and front beam 20 at a point between front posts 16 and 21. A fore and aft horizontal beam 29 also extends forwardly from rear beam 23 to and beyond the lower end of member 21 and a bar 30 extends diagonally from the lower end of member 21 to a point adjacent the outer end of said rear beam. At the extreme right, as viewed from the rear of the harvester, a side beam 31 (Fig. 7) extends diagonally upward toward the rear, the same being supported at a point intermediate the ends thereof by post 22 and at its after end by diagonal brace 32 which is secured to a bracket 33 projecting rearwardly from rear beam 23. Connecting the after end of side beam 31 and the upper end of post 22 is a side beam 34 that slopes downwardly toward the rear. A diagonal brace 35 is also provided between the outermost end of front beam 20 and rear beam 23 at a point back of the driver's seat on tractor T. It will be seen that a frame on which to mount the operating parts of the harvester is thus supported solely by the chassis of tractor T, thereby making the complete harvester as readily maneuverable as the tractor itself. Other minor elements of the frame structure will be referred to as the description of the operating parts proceeds.

As heretofore pointed out, novel means are provided for gathering the stalks of cane growing in a single row and lifting the same to a vertical or nearly vertical position in order that the stalks may be properly stripped, topped and cut. In the form shown said gathering and erecting means comprises two forwardly and downwardly extending diverging arms 36, 36' (Fig. 3), the inner upper ends of which are substantially parallel and supported by brackets 37, 37' on the adjacent sides of front supporting posts 22, 21, the outer ends thereof being supported by the forwardly projecting portions of beams 29 and 31. Since gathering arm 36' and its associated parts are of substantially the same construction as gathering arm 36 and its associated parts, only the former will be described in detail. As shown, arm 36 is a bent, channel-shaped member adapted for guiding an endless gathering chain 38 which meshes with sprockets 39 and 40 which are rotatably mounted at opposite ends of said arm. A roller 40' may be provided at the bent in arm 36 for giving further non-friction support to chain 38. A plurality of spaced step or scoop-like projections are provided on chain 38 for engaging the cane stalks during movement of the chain. Said projections may be constituted by elements 41 and 42 which are each pivotally connected to links of chain 38 and to each other in such a manner that elements 41 will project at substantially right angles to the chain. As viewed in Fig. 3, the outboard or left-hand gathering chain 38 is driven in a counterclockwise direction and the inboard gathering chain 38' is driven in a clockwise direction by suitable driving means to be hereinafter described. The component of the linear speed of gathering chains 38, 38' along the line of movement of the harvester is preferably substantially equal to the forward speed of tractor T. Thus, during the harvesting operation the tractor is driven to the left of a row of cane to be harvested so that gathering arms 36, 36' straddle said row, thereby permitting chains 38, 38' to gather the stalks together and lift those growing at an angle to a substantially vertical position.

To insure that all of the stalks in each row will be properly directed between arms 36, 36' and thence to a conveyor to be hereinafter described, a pair of right angle supporting brackets 43 and 44 are provided in the upper corners of the arch constituted by members 20, 21 and 22, and guiding means, including a member 45 and diverging arms 46 are supported thereby. Member 45 extends downwardly and forwardly above gathering arm 36' and beyond the front of tractor T, the forward end of said member being adjacent the ground and supported by a brace 35' from the chassis.

Novel means are provided for stripping some of the leaves from the intermediate portions of the stalks as the latter are erected by gathering chains 38, 38' and, in the form shown, said means are constituted by four pairs of diametrically disposed, radially extending elements 47 secured to a rotatable shaft 48 in axially spaced relation, alternate pairs of said elements extending at right angles to each other. Shaft 48 may be journalled in a bearing on the lower portion of bracket 43 and supported at its forward end by a brace 49 from the tractor chassis. Means for rotating shaft 48 will be hereinafter described. Elements 47 of the stripping means may be constituted by substantially rigid propeller like blades, but the same are preferably constituted by short lengths of flexible metallic cable having pieces of pipe 50 or similar weights secured to the outer ends thereof in order that the same will be held substantially taut by centrifugal force during rotation of shaft 48. A hollow metallic drum 51 having a substantially larger diameter than shaft 48 may be mounted around the latter to obviate the winding of leaves or other foliage about the shaft. If desired, a similar rotating stripping means may be mounted on bracket 44 and extend forwardly over the outboard gathering means 36, 38.

In order to remove the upper-most portions, including the upper leaves or bush portions of the stalks of cane which grow very tall, novel means are provided for cutting said portions off and throwing the same clear of the harvester. Said cutting means, in the illustrated embodiment, comprises a pair of knives 52, 52 mounted on opposite ends of a bar 53 that is in turn mounted on a shaft 54 for rotation therewith. Knives 52 are secured to bar 53 with the sharpened edges thereof extending in the direction of rotation of the latter. Shaft 54 is journalled in suitable bearings mounted on a bracket 55 extending upwardly from front beam 20 and is driven by means to be described hereafter. If desired, shaft 54 and accordingly knives 52 may be mounted for adjustment in a vertical direction.

After each stalk of cane is stripped and topped by the novel means above described, the central portion thereof is individually gripped by a novel conveyor mechanism, the entrance to which is located between the converging upper ends of gathering arms 36, 36'. Each stalk may thus be held against bending movement while the same is being severed from its roots at a point near the ground by cutting means to be later described. As shown, the conveyor mechanism comprises two vertically spaced channel members 56, 56 which extend rearwardly and upwardly from immediately below the space between the converging ends of arms 36, 36' and thence at right angles and upwardly to a point behind tractor T. A strip of yieldable material such as a hollow rubber tube or strip 57 is mounted in and projects beyond the flanges of each of said channel members. Any suitable means, such as cement, may be employed for securing strips 57 between the flanges of channel members 56. The latter may be held in spaced relation by metal straps 58 and supported by suitable braces secured to the harvester frame, such as indicated at 59.

Figures 1, 2:
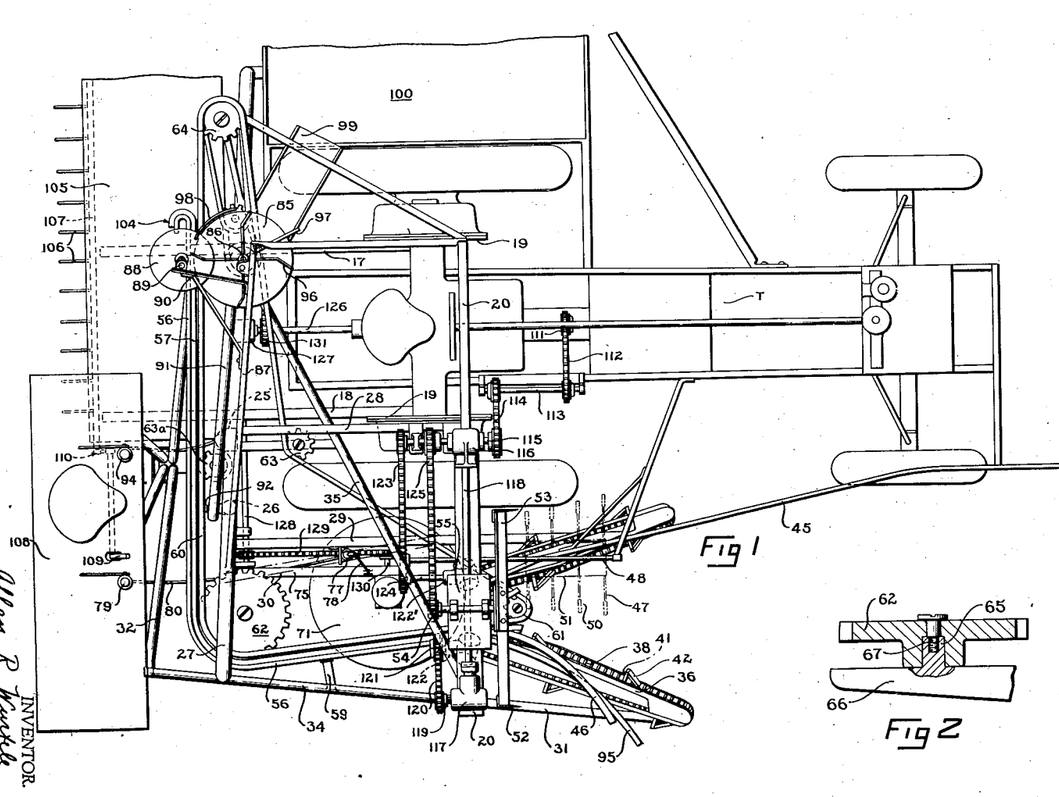
Fig. 1 is a top plan view of one embodiment of a harvester embodying the present invention, parts thereof being broken away and the stripping means being shown by construction lines in the interest of clarity.
Fig. 2 is a detail sectional view of a conveyor chain sprocket and mounting therefor.

In a plane between channel members 56 and paralleling the same for cooperation therewith is one loop of a movable endless conveyor element, such as chain 60, which is supported on a plurality of sprockets 61, 62, 63, 63a and 64 (Fig. 1). The first four of said sprockets, and particularly large sprocket 62, are preferably of the disc type to prevent the tangling of leaves therewith and are rotatably mounted on stationary stub shafts secured to suitable brackets extending from adjacent frame members of the harvester. As shown in Fig. 2, sprocket 62 is rotatably mounted on a stub shaft 65 projecting upwardly from a bracket 66 and is held in place by threaded member 67. Each of the other sprockets may be mounted in a like manner. Sprocket 64 is supported at a point beyond the ends of channel members 56 by means of braces 68 and 69 which are secured to frame members 15 and 27 respectively (Fig. 13).

Figures 8, 9, 10, 11, 12:
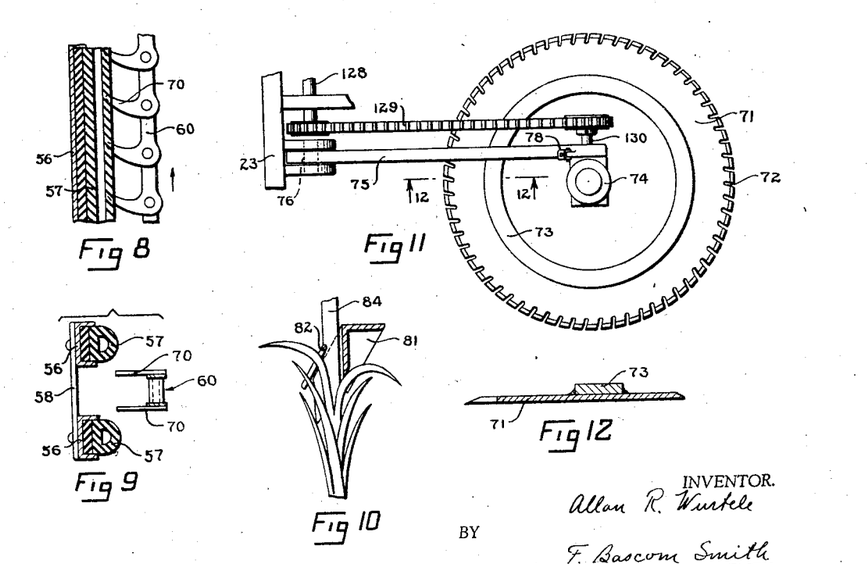
Figs. 8 and 9 are detail horizontal and vertical sections, respectively, of portions of the conveyor mechanism.
Fig. 10 is a detail view of a portion of one form of foliage removing means employed in carrying out the invention, the view being taken substantially on line 10—10 of Fig. 7.
Fig. 11 is a detail top plan view, with parts broken away, showing the stalk cutting means and mounting therefor.
Fig. 12 is a sectional view taken substantially on line 12—12 of Fig. 11

Conveyor chain 60 is preferably made up of a series of links each having claw-like portions 70 partially extending between the projecting portions of rubber strips 57 (Figs. 8 and 9). The projecting portions 70 of adjacent links of the conveyor chain and the outer surfaces of strips 57 form, in effect, vertical openings in which stalks of cane may be yieldingly gripped and supported in a substantially vertical position without danger of breaking the stalks. It will be understood that chain 60 is driven by suitable power means, to be hereinafter described, in a clockwise direction, as viewed in Fig. 3, at a linear speed substantially equal to the forward speed of the harvester so that after a stalk is picked up by the conveyor chain where the latter passes around sprocket 61, it is carried rearwardly and upwardly relative to the tractor and maintained in a vertical position for engagement by novel cutting means to be next described. Because of the inclination of the conveyor and the gripping action thereof, the stalks may be wholly or partially pulled out of the ground before being cut from their roots, thereby obviating any waste.

Since the portion of each cane stalk adjacent the ground has a high sugar content it is highly desirable that the same be cut near the ground and in some instances below the surface of the ground adjacent the roots. Novel means are accordingly provided for this purpose and one form of such means shown in the drawings (Figs. 7 and 11) comprises a rotary disc-like cutter 71 mounted below the conveyor 57, 60 for adjustment in a vertical direction. The periphery of cutter 71 is bevelled to provide a sharp cutting edge and is preferably provided with a plurality of notches 72 to give the same a saw effect. As shown, notches 72 have parallel sides which extend at a small angle to the radii passing through the same points on the periphery of the cutter and preferably extend inwardly beyond the bevelled portion. A heavy metallic ring 73 may be welded or otherwise secured to the upper surface of cutter 71 to add to the inertia and hence the flywheel effect thereof.

Cutter 71 is secured to the lower end of a vertical shaft which is journalled and supported in a gear casing 74 that is in turn secured to the free end of an arm 75 which is pivoted at 76 on rear beam 23, thereby permitting the cutter to be raised and lowered at will. When the cutter is lowered by pivoting arm 75 until the forward edge of disc 71 is near the ground, said disc is preferably inclined toward the rear at an angle somewhat less than the angle of inclination of conveyor 57, 60. The disc will not then be retarded by engagement with stubbles and the conveyor will lift the severed stalks clear of the latter. For effecting vertical adjustment of disc 71, suitable power means, such as a hydraulic jack 77, may be provided, the movable element of said jack being connected to arm 75 by means of a cable 78. The fluid cylinder of the jack may be connected to a control cylinder 79 through a flexible conduit 80. Since suitable hydraulic jacks for the above purpose are well-known and do not, per se, constitute any part of the present invention, a detailed showing and description thereof is not believed to be necessary. For example, a standard "Black Hawk hydraulic jack" may be employed. The driving mechanism for cutter 71 will be later described.

After a stalk of cane has been cut by disc 71, the same is carried rearwardly and upwardly by conveyor chain 60 through additional novel stripping means which are effective to remove the leaves, vines, etc., from the lower end of the stalk. In the illustrated embodiment said stripping means comprises a knife in the form of an angle iron 81 (Figs. 7 and 10) having the lower edge of a vertically disposed side thereof sharpened to serve as a knife and a resiliently anchored wire 82 extending parallel thereto. Knife 81 is supported at the forward end thereof directly below sprocket 61 adjacent the mouth of the conveyor and extends downwardly to rear beam 23 in substantially the same vertical plane as conveyor chain 60. Wire 82 is secured to the lower channel member 56 of the conveyor adjacent the mouth of the latter and extends parallel to and adjacent stripping knife 81. The lower end of said wire is preferably anchored to the harvester frame by any suitable resilient means, such as a spring 83. It will thus be seen that a stalk 84 of cane which is vertically supported and carried by the conveyor 57, 60 will be yieldingly held against knife 81 by wire 82. As said stalk is carried toward the rear of the harvester by conveyor chain 60, it is lifted upwardly, in effect, past knife 81 and wire 82, thereby insuring the removal of leaves, vines, etc., from the lower end thereof.

Figure 5:
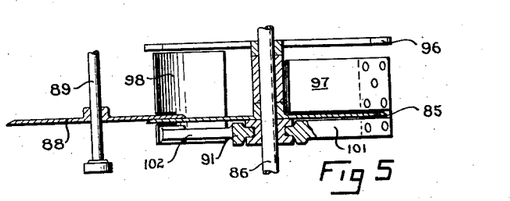
Fig. 5 is a detail view, with parts broken away, of the nubbins cutter and associated parts.
Figure 6:
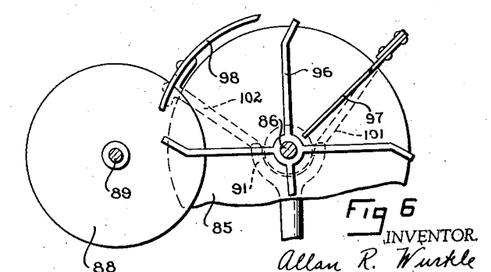
Fig. 6 is a top plan view of the parts shown in Fig. 5.

The only thing remaining to be done to a stalk of cane after the above described stripping and cutting operations to prepare the same for delivery to the sugar mill is the removal of the nubbins from the upper end thereof. Inasmuch as the nubbins are valuable as feed for live stock, novel means are provided for cutting and collecting the same. Said means are preferably located near the end of conveyor 57, 60 and, in the form shown, comprise a vertically adjustable rotating cutter 85 (Figs. 1 and 5) mounted on a shaft 86 for rotation therewith and free sliding movement axially thereof. Said shaft is journalled in bearings provided on structural members 27 and 87. For enhancing the effectiveness of cutter 85, a disc 88 is freely mounted in overlapping relation therewith on a shaft 89 that is parallel with shaft 86 and is supported by channel member 56 and a bracket 90 on member 87. Disc 88 rests upon and frictionally engages cutter 85 and moves vertically therewith, the overlapping portions being directly above the path of the cane stalks, i. e., above conveyor chain 60. Vertical movement of the nubbins cutter and disc 88 may be effected by movement of a lever 91 which is pivoted at 92 and has a bifurcated portion at the free end thereof engaging a slotted collar on the hub of cutter 85. Any suitable power means such as a hydraulic jack 93 and a control cylinder 94 therefor may be provided for pivoting lever 91 to adjust cutter 85 along shaft 86. It will be understood that the proper position for cutter 85 will be determined by the height of the cane being harvested. If desired, a guide rod 95 may be positioned above and extend parallel to the conveyor for holding the upper ends of the cane stalks in a vertical position and for directing the same against cutter 85. A curved portion of rod 95 may also extend forwardly from the lower corner of bracket 44 (Fig. 3) for assisting in guiding the stalks into the conveyor.

As the nubbins are cut from the stalks, the same are caused to fall onto the upper surface of cutter 85 by a plurality of radially extending arms 96 projecting from a hub mounted on shaft 86 in spaced relation to cutter 85. The nubbins are carried around by the cutter and guided by suitable deflectors 97 and 98 into a chute 99 which leads to a bin 100 mounted on the left-hand side of the tractor, as viewed from the rear. Deflectors 97, 98 may be rigidly secured to lever 91 for vertical movement therewith by suitable brackets 101 and 102 and chute 99 may be suspended from the harvester frame by means of straps 103. The nubbins which are accumulated in box 100 may be removed at the end of each row or at any time and utilized for any suitable purpose, such as feed for live stock.

Each stalk of cane after passing the nubbins cutter 85, 88 is carried on to the left, as viewed from the rear, by conveyor chain 60 to a point where stationary members 56, 57 are bent back upon themselves, as shown at 104 (Fig. 1). When each stalk has passed the ends of said members, it falls upon a platform 105, which is supported by beams 17, 18 and slopes downwardly toward the rear. A retaining fork comprising a plurality of prongs 106 on a shaft 107 is pivotally mounted at the rear edge of said platform and is preferably normally held in position to retain the stalks on the platform until it is desired to dump the same in a manner to be hereinafter described. Prongs 106 may be turned downwardly, if desired, so that each stalk will roll off platform 105 as soon as the same is deposited thereon. The stalks are thus dropped in the field in such position that they will be out of the path of the harvester during its next turn around the field.

An operator's platform 108 may be provided at the rear of the harvester and is preferably sufficiently high to permit an operator to observe substantially all of the operating parts at all times. Control cylinders 79 and 94 for hydraulic jacks 77 and 93, respectively, are mounted on platform 108, as is also a pivoted control lever 109. The latter is connected through a suitable linkage 110 to shaft 107 so that when a convenient size bunch of cane stalks has accumulated on platform 105 the operator may dump the same by the operation of lever 109. Any suitable and well-known means may be provided for releasably locking lever 109 in any desired position to thereby normally hold prongs 106 in any suitable position.

A single prime mover, i. e., the engine of tractor T, may be employed for propelling the harvester through the field and for actuating all of the power driven operating parts thereof. In the embodiment illustrated, the driving trains for gathering chains 38, 38', stripper shaft 48 and topping cutter shaft 54 comprise a sprocket 111 mounted on the drive shaft of tractor T between the transmission and differential thereof. From sprocket 111 power is transmitted through a chain 112, a shaft 113 mounted on the tractor chassis and a chain 114 to a shaft 115 rotatably supported by front beam 20 and cross beam 28. Shaft 115 through suitable bevel gears in gear boxes 116, 117 and a shaft 118 is adapted to drive a short shaft 119. The latter is drivably connected by means of a chain 120, a shaft 121 and suitable bevel gears in a gear box 122, to sprocket 39, which, as heretofore pointed out, meshes with and drives the outboard gathering chain 38. The corresponding sprocket which meshes with the inboard gathering chain 38' is drivably connected to shaft 115 by means of a chain 123, shaft 124, and suitable bevel gears in a gear casing 122'. Chain 123 also meshes with a sprocket on the inner end of stripper shaft 48 for actuating the stripper elements 47, 50. Topping knives 52 are driven by means of a chain 125 which meshes with sprockets on shafts 115 and 54.

The drive for conveyor chain 60 and cutters 71 and 85 is preferably taken from a shaft 126 which is connected to the drive shaft of the tractor within the differential gear housing thereof in a manner well understood in the art, the outer end of shaft 126 being journalled in a gear box 127 mounted on rear beam 23. Drivably connected to shaft 126 by means of suitable bevel gears in box 127 and extending at right angles thereto is a shaft 128 (Fig. 1) which is preferably co-axial with pivot 76 of cutter supporting arm 75. The outer end of shaft 128 is connected by means of a chain 129 to a shaft 130 which is in turn drivably connected by means of suitable gears in housing 74 to the vertical shaft that supports cutter 71.

For driving conveyor chain 60 and nubbins cutter 85, shaft 126 has a sprocket 131 (Figure 13) thereon which meshes with a chain 132 that also meshes with a sprocket 133 on a horizontal shaft which is drivably connected through bevel gears in a gear box 134 to a vertically extending shaft 135. The latter is connected by means of a chain 136 to a shaft 137 that is associated with sprocket 64 and by means of a chain 138 to cutter shaft 86.

It will, of course, be understod that the various driving and driven sprockets and gears may be varied in size to obtain the most effective operating speed for the various parts. It will also be understood that suitable clutches, flexible couplings, universal joints, and the like may be inserted in the driving trains wherever this is found desirable.

In the operation of the harvester, tractor T is driven along the edge of the field, or astraddle a row of cane which has already been cut, and to the left of the row being harvested with arms 36, 36' astraddle said row. In the illustrated embodiment, whenever the tractor clutch is engaged to impart forward motion to the harvester, the power driven operating parts thereof are also started to operate. Accordingly, said parts operate only when the harvester is in motion and at a speed proportional to the forward speed of the tractor.

With the aid of guide rod 45 and, if desired, a similar rod (not shown) on the other side of the row, the cane stalks are guided between gathering arms 36, 36'. Thus, stalks which are not growing in a vertical position or nearly vertical position are erected and gathered together, as the harvester moves forward, by arms 36, 36' and gathering chains 38, 38'. At the same time the revolving stripping elements 47, 50 strike the cane leaves on the central portions of the stalks and strip the same from the stalks. Also, the uppermost leaves which are not removed by said stripper elements are sheared off by revolving knives 52. The stalks are then individually picked up by conveyor chain 60 and directed between said chain and rubber strips 57 in channel members 56. Said strips and projections 70 on the conveyor chain overlap sufficiently to insure a firm gripping action thereby on each stalk of cane. As the harvester continues its forward movement after the stalks are gripped by the conveyor, cutter 71 moves into engagement with each stalk while the latter is gripped by the conveyor and shears the same off at or near its roots.

When the stalks first enter conveyor 57, 60, the same also move between stripping knife 81 and wire 82. Due to the divergence of said knife and the conveyor in the direction of movement of cane stalks 84, the latter are, in effect, pulled upwardly past knife and wire which are effective to strip the leaves and any foreign matter from the lower ends of the stalks.

The stalks are then carried around by the conveyor chain in sliding engagement with strips 57 at substantially right angles to the direction of movement of the harvester and the upper ends thereof are directed against rotary cutter 85 which is effective to cut the nubbins therefrom. After a slight further movement of the stalks by the conveyor chain the same reach the ends of channel members 56 and are thus released and permitted to fall on sloping platform 105. When a convenient size bunch of stalks have accumulated on said platform the same are dumped by the operation of lever 109 and hence fork 106, 107. The nubbins, as they are cut, fall upon the upper surface of cutter 85 and are directed by deflectors 97 and 98 into chute 99 and thence into bin 100. The nubbins may be removed from bin 100 at suitable points in the field.

Figure 14:
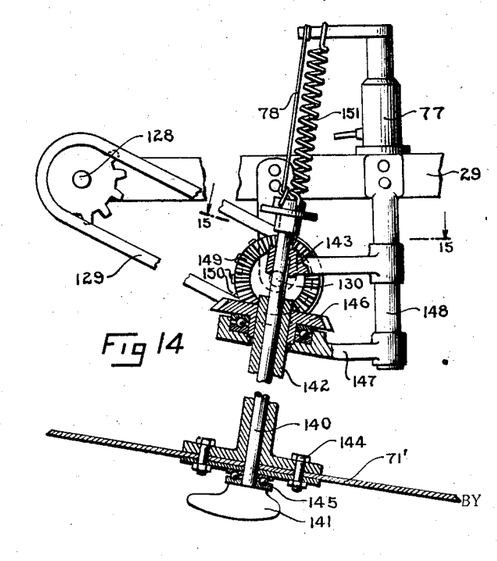
Fig. 14 is a detail side elevation view, partly in section and with parts broken away, showing a modified form of stalk cutting means which may be employed in carrying out the invention; and, Fig. 15 is a detail view, partly in section and with parts broken away, taken substantially on line 15—15 of Fig. 14.
Figure 15:
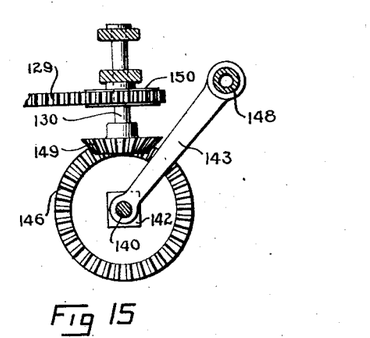

A modified form of the stalk cutting means which may be employed in the above described harvester is illustrated in Figs. 14 and 15 and as shown comprise a rotatable cutting disc 71' mounted for free rotary movement on stem 140 of a ground engaging support 140, 141. The foot or runner portion 141 of said support is adapted to slide along on the ground and stem 140 slidably extends through a sleeve 142 and a guide 143. The upper end of stem 140 is connected by means of cables 78 to the movable element of hydraulic jack 77 so that the downward movement of shoe 141 and cutter 71' is limited by the position of said movable element. The lower end of sleeve 142 is provided with a flange to which cutter 71' is rigidly secured by any suitable means such as bolts 144. Sleeve 142 and cutter 71' are preferably supported on a roller thrust bearing 145 at the upper edge of shoe 141. The outer periphery of sleeve 142 is preferably rectangular and slidably extends through a similar opening in a bevel gear 146 which is mounted in a suitable bearing on a support 147, the latter and arm 143 being secured to a support 148 attached to and depending from beam 29. Gear 146 is in constant mesh with a bevel gear 149 mounted on horizontal shaft 130 which carries a sprocket 150 meshing with chain 129. Any suitable resilient means, such as a spring 151, may be interposed between the movable element of jack 70 and the upper end of stem 140 to relieve cable 78 of a portion of the weight of the cutter assembly so that the latter will move up and down freely in response to the unevenness of the surface which is engaged by runner 141.

It will be seen that during the movement of the harvester through the field the position of disc 71' relative to the ground will not be affected in any way by the roughness of the field. Upon any tilting movement of the tractor or when the cutter passes over rough ground support 140, 141 and hence cutter 71' will move up and down at will, the shoe 141 remaining on the ground and the forward edge of the cutter remaining close to the ground at all times. The inclination of disc 71', which also remains constant at all times, is preferably somewhat less than the inclination of conveyor 67, 60 for reasons pointed out above in connection with cutter 71.

There is thus provided a novel harvester which is adapted for harvesting sugar cane and which is simple both in construction and operation, is light of weight and readily maneuverable and which is so constructed that all of the operating parts are readily accessible and visible at all times. Also, a mobile mechanical cane harvester is provided which effectively cuts the cane, strips the foliage therefrom, and cuts the nubbins from the upper ends thereof, thereby preparing the stalks for immediate delivery to the sugar mill. Means are provided, too, for preserving the nubbins for use as feed. The simplicity of the novel harvester comprehended renders it possible to removably mount the same on a power driven vehicle, such as a tractor, so that the latter may be employed for other uses outside of the cane harvesting season. Additionally, a harvesting machine made in accordance with the present invention may be adequately manned by two persons, thereby rendering it possible for a small number of men to harvest sugar cane rapidly and economically. Additionally, the harvester embodies novel stripping and cutting means, as well as novel means for conveying the stalks in a substantially vertical position. Novel means are also provided for gathering and erecting the stalks which grow at an angle to the vertical. Harvesters of the character comprehended by this invention may be inexpensively constructed from a relatively small number of parts and economically operated by a single power unit.

Although only a limited number of embodiments of the invention have been illustrated and described in detail it is to be expressly understood that the same is not limited thereto. Various changes may be made, for example, in the design and arrangement of the parts illustrated, as will now be apparent to those skilled in the art, without departing from the spirit and scope of the invention. For a definition of the limits of the invention reference is had primarily to the appended claims.

What is claimed is:

1. In apparatus for harvesting plants having stalks, a tractor having an engine for propelling the same and harvester means bodily detachable from and wholly supported by said tractor comprising means for cutting said stalks adjacent the ground, means for conveying said stalks along at least one side of the tractor, and power transmitting means interposed between the drive shaft of said engine and said cutting and conveying means for actuating the latter.

2. In apparatus for harvesting plants having stalks, a tractor having an engine for propelling the same and harvester means bodily detachable from and wholly supported by said tractor comprising means for cutting said stalks, unitary conveying means for conveying said stalks along at least two sides of the tractor, and means for drivably connecting said cutting and conveying means with the drive shaft of said engine.

3. In a cane harvester, power means for propelling the harvester through the field, rotatable cutting means mounted on the harvester and driven by said power means for cutting the leaves projecting above the upper ends of the cane stalks, and means mounted on said harvester for thereafter severing said stalks from the roots thereof.

4. In a cane harvester, power means for propelling the harvester through the field, rotatable cutting means mounted on the harvester for cutting leaves projecting from and beyond the upper ends of the cane stalks, said cutting means comprising a rotatable arm and a cutting blade at the outer end of said arm, and means operatively connecting said cutting means to said power means.

5. In a cane harvester, power means for propelling the harvester through the field, and means drivably connected to said power means for cutting leaves projecting from and beyond the upper ends of the cane stalks, said cutting means comprising a revolving cutting member having a substantially horizontal axis of revolution and a substantially horizontal cutting edge.

6. A sugar cane harvester comprising means for gathering the cane plants of a single row and lifting the same to a relatively upright position, rotatable means for cutting foliage off the upper ends of said plants before the stalks thereof are cut, conveyor means for yieldably gripping said stalks intermediate the ends thereof and carrying the same in a relatively upright position, means for cutting said stalks adjacent the ground while the same are gripped by said conveyor means, means for stripping leaves from said stalks in response to movement of the latter by said conveyor means, and rotatable cutting means for cutting the upper ends from said stalks while the latter are held in a relatively upright position by said conveyor means.

7. In a harvester for plants having stalks, means adapted for conveying said stalks in an upright position comprising a pair of stationary, vertically-spaced, rigid members, resilient strips stationarily mounted on and projecting from said members, an endless conveyor chain mounted for movement in a plane between said members, projections on the links of said chain extending between said resilient strips, and means for actuating said chain.

8. In a harvester for plants having stalks, means adapted for conveying said stalks in a relatively upright position comprising two elongated, stationarily-mounted, yieldable members for engaging each stalk at two spaced points on one side thereof, an endless movable member engaging said stalk on the opposite side thereof intermediate said two first-named points and adapted to hold said stalk in engagement with said yieldable members whereby said stalk is supported, and means for actuating said endless member to move said stalk along said yieldable members.

9. A harvester for plants having stalks, a supporting frame, a conveyor mounted on said frame for successively conveying stalks along two sides of the harvester, said conveyor including stationarily-mounted yieldable means extending along said two sides of the harvester for engaging one side of each stalk and endless movable means engaging the opposite side of each stalk for holding the latter in engagement with said yieldable means, and power means for actuating said movable means for moving said stalk along said yieldable means.

10. In a harvester for plants having stalks, means for cutting said stalks, means adapted for yieldably gripping the stalks and conveying the same in a relatively upright position along two sides of the harvester, said second-named means including yieldable stationary means extending along said two sides of the harvester, and an endless conveyor member mounted to cooperate with said yieldable means, said member and yieldable means being mounted in parallel relation to each other to yieldably grip a localized portion of each stalk intermediate the ends thereof for supporting the same, and power means for actuating said member for moving said stalks along said yieldable means.

11. In a harvester for plants having stalks, means for cutting said stalks adjacent the ground, a unitary conveyor for gripping the stalks during the cutting thereof and for conveying the severed stalks in a relatively upright position in at least two directions, one of which is at an angle to the direction of movement of the harvester, and for releasing the same to fall at the rear of the harvester in a horizontal position at substantially right angles to the direction of movement of the harvester, said conveyor comprising a single endless member for engaging said stalk during its entire travel through the conveyor, and power means for actuating said member to carry the stalks through the conveyor.

12. In a harvester for plants having stalks, means for cutting said stalks, a single conveying mechanism for carrying the severed stalks first in a direction generally opposite to the direction of movement of the harvester and then in a direction at a substantial angle to said direction of movement, said mechanism comprising an endless movable member which continuously engages each stalk during the entire travel of the latter through the conveying mechanism, and power means for actuating said endless member to move said stalk through the conveying mechanism.

13. In a harvester for plants having stalks with leaves thereon, means adapted for conveying a stalk in a relatively upright position, and means for stripping leaves from said stalk in response to movement of the latter by said first-named means, said stripping means comprising at least two stripper members adapted to simultaneously engage opposite sides of the stalk, at least one of said members being flexible.

14. In a cane harvester, means adapted for conveying a cane stalk in a relatively upright position, and means for stripping foliage from said stalk while the latter is supported and moved by said conveying means, said stripping means comprising elements engaging opposite sides of said stalk and extending at a diverging angle from said first-named means in the direction of movement of the stalk, at least one of said elements being flexible.

15. In a harvester for plants having stalks, means adapted for conveying a stalk in a relatively upright position, and means for stripping foliage from said stalk during movement thereof by said conveying means, said stripping means comprising a stationary cutting member on one side of said stalk, and a spring tensioned wire on the other side of said stalk.

16. In a cane harvester, means adapted for gripping and conveying stalks in a relatively upright position, vertically adjustable means above said conveying means for cutting the upper ends from said stalks while the latter are gripped by said conveying means, a container, and means for directing the severed upper ends into said container.

17. In a harvester for plants having stalks, means adapted for gripping and conveying said stalks in a relatively upright position, rotatable means above said conveying means for cutting the upper ends off said stalks while the latter are gripped by said conveying means, a container mounted on the harvester, and means for directing the severed upper ends of said stalks into said container.

18. In apparatus for harvesting plants having stalks, a tractor having an engine for propelling the same, harvester means bodily detachable from and wholly supported by said tractor comprising rotatable means for cutting off the upper portions of said plants, means for thereafter cutting the stalks of said plants adjacent the ground and means for conveying said stalks along at least one side of the tractor, and power-transmitting means interposed between the drive shaft of said engine and said cutting and conveying means for actuating the latter.

19. In a can harvester, a tractor having power means for propelling the same through a field and harvester means detachably mounted on and wholly supported by said tractor comprising rotatable cutting means driven by said power means for cutting the leaves projecting above the upper ends of the cane stalks and means for thereafter severing said stalks from the roots thereof.

20. In apparatus for harvesting plants having stalks, a tractor having an engine for propelling the same, harvester means bodily detachably from and wholly supported by said tractor comprising means for cutting said stalks adjacent the ground, means for conveying said stalks along at least one side of the tractor in a relatively upright position, said conveying means including elongated, stationarily-mounted yieldable means for engaging each stalk at one side thereof and endless movable means for engaging the opposite side of each stalk to hold the latter in gripping engagement with said yieldable means whereby said stalk is supported, and power-transmitting means interposed between the drive shaft of said engine and said cutting and conveying means for actuating the latter.

21. In apparatus for harvesting plants having stalks, a tractor having an engine for propelling the same through a field, harvester means bodily detachable from and wholly supported by said tractor comprising means for cutting said stalks adjacent the ground and means for conveying said stalks along at least one side of the tractor, said conveying means including elongated yieldable means for engaging said stalks at one side thereof and an endless movable chain for engaging the opposite sides of said stalks to hold the latter in gripping engagement with said yieldable means whereby said stalks are supported, said chain having laterally extending portions adapted to extend between successive stalks, and power-transmitting means interposed between the drive shaft of said engine and said cutting and conveying means for actuating the latter.

22. In a harvester for cane plants, power means for propelling the harvester through a field, rotatable cutting means mounted on the harvester and driven by said power means for cutting the leaves projecting above the upper ends of the cane stalks, means mounted on said harvester for thereafter severing said stalks adjacent the roots thereof, means for conveying said stalks in a relatively upright position, said conveying means including elongated, stationarily-mounted yieldable means for engaging one side of each stalk and endless movable means for engaging the opposite side of each stalk to hold the latter in gripping engagement with said yieldable means whereby said stalk is supported, and means for drivably connecting said endless movable means to said power means for moving said stalks along said yieldable means.

ALLAN R. WURTELE.